United States Patent
Mori et al.

[11] 3,797,913
[45] Mar. 19, 1974

[54] ELECTRO-OPTIC DISPLAY DEVICE

[75] Inventors: Toshio Mori; Chiaki Kojima; Hidemasa Tamura, all of Kanagawa, Japan

[73] Assignee: Sony Corporation, Tokyo, Japan

[22] Filed: Nov. 29, 1971

[21] Appl. No.: 202,789

[30] Foreign Application Priority Data
Nov. 30, 1970 Japan............................ 45-106132

[52] U.S. Cl. ................................. 350/150, 350/157
[51] Int. Cl. ......................... G02b 27/28, F02f 1/26
[58] Field of Search ............ 350/147, 150, 156, 157

[56] References Cited
UNITED STATES PATENTS

| | | |
|---|---|---|
| 2,909,973 | 10/1959 | Koelsch et al. .............. 350/150 UX |
| 3,592,527 | 7/1971 | Conners et al. ..................... 350/150 |
| 3,517,206 | 6/1970 | Oliver ................................ 350/150 |
| 3,502,875 | 3/1970 | Ploss et al. .......................... 350/150 |
| 3,435,445 | 3/1969 | Clendinning et al ............... 350/150 |
| 3,625,591 | 12/1971 | Freiser et al ........................ 350/150 |
| 3,559,185 | 1/1971 | Burns et al ......................... 350/150 |
| 3,602,904 | 8/1971 | Cummins ............................ 350/150 |
| 3,576,356 | 4/1971 | Hyman et al. ...................... 350/156 |
| 3,566,099 | 2/1971 | Makas ................................ 350/156 |

*Primary Examiner*—John K. Corbin
*Attorney, Agent, or Firm*—Hill, Sherman, Meroni, Gross & Simpson

[57] ABSTRACT

In an electro-optic display device comprising a polarizing plate and a display panel having a plurality of electro-optic elements arranged in a predetermined pattern on a suitable base plate, in which a suitable voltage is selectively supplied to the plurality of electro-optic elements to alter the angle of double refracted light in response to the voltage, the electro-optic display device further comprising a means formed between the display panel and the polarizing plate for supplying circular polarized light to the electro-optic elements.

8 Claims, 11 Drawing Figures

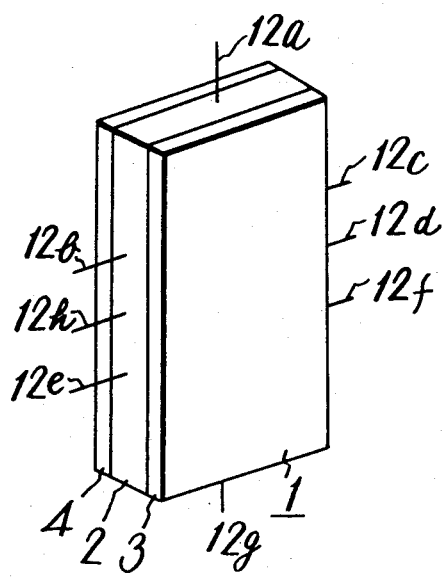
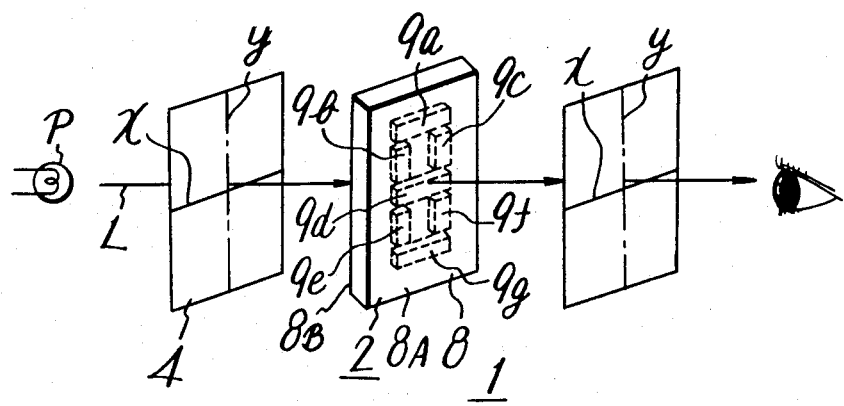

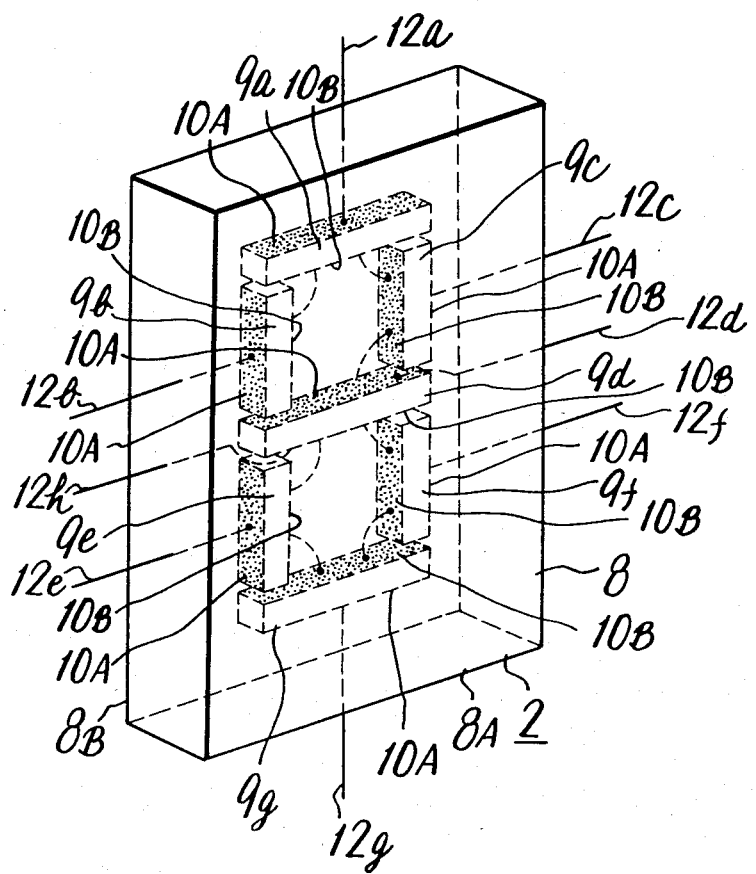

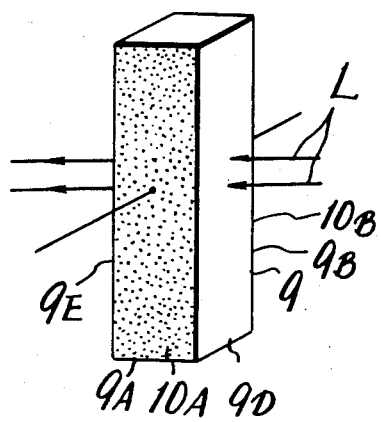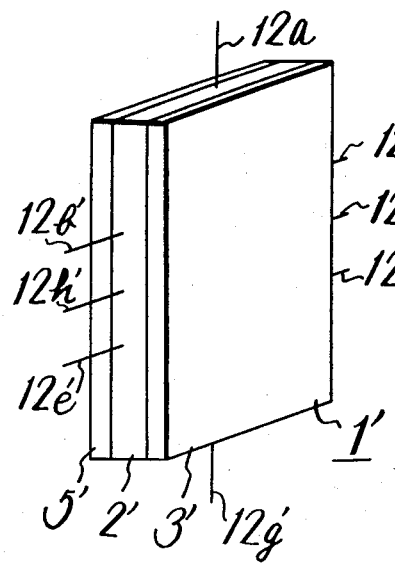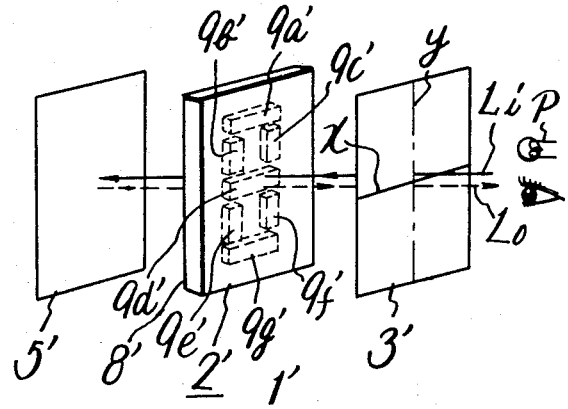

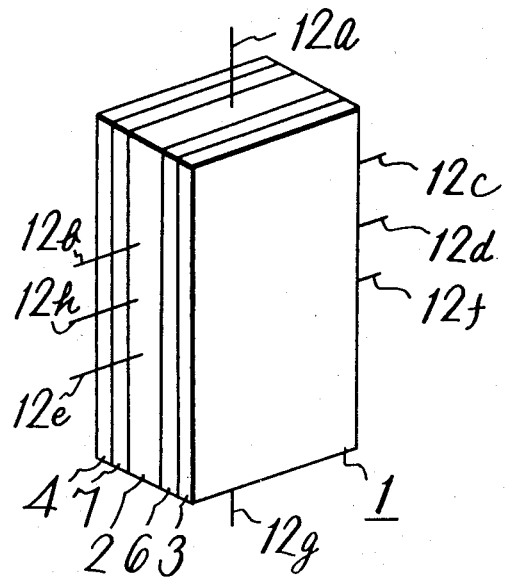
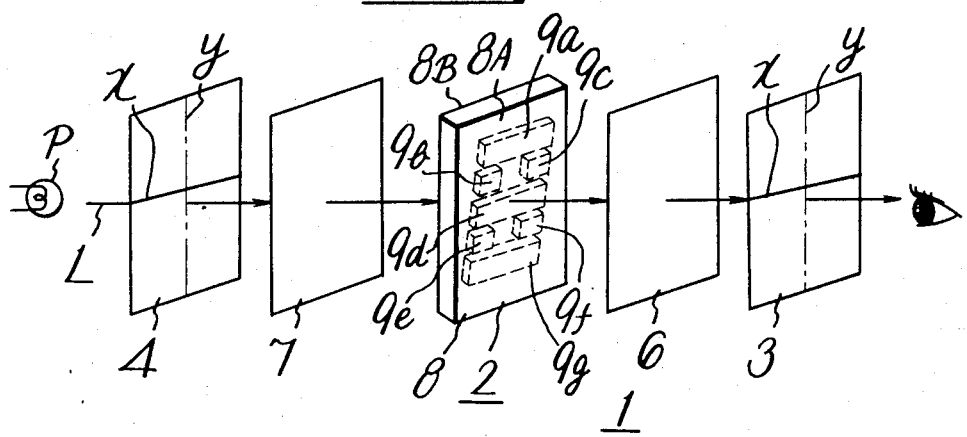

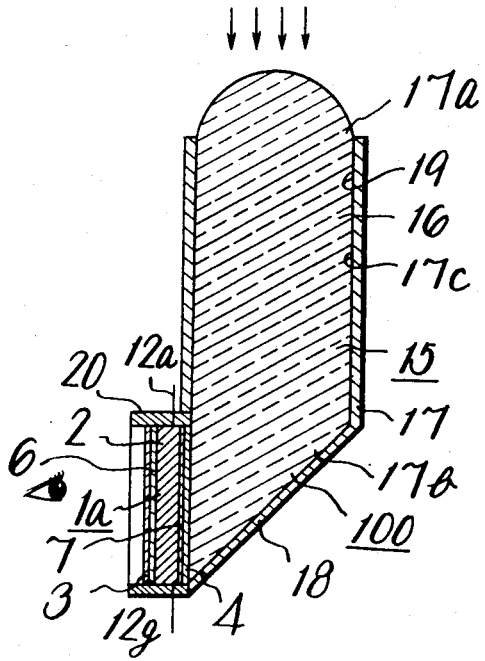
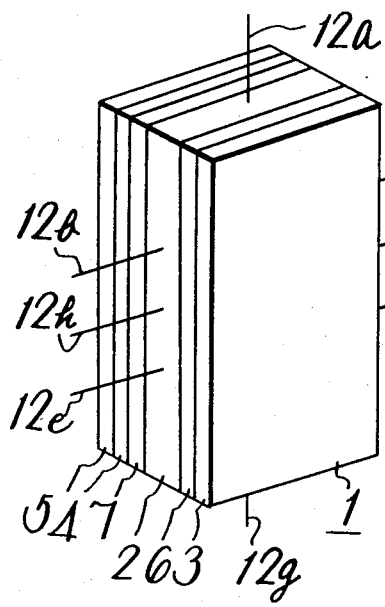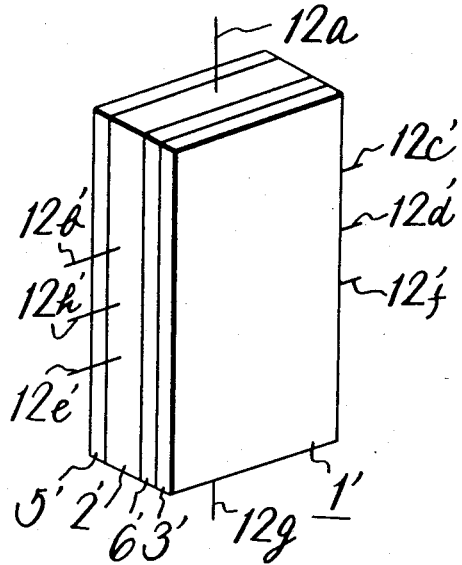

ELECTRO-OPTIC DISPLAY DEVICE

BACKGROUND OF THE INVENTION

1. Field of the Invention

This invention relates to an electro-optic display device, and more particularly to an electro-optic display device provided with a means for producing a circular polarization of light in front of an electro-optic element.

2. Description of the Prior Art

In recent years a solid display device has been studied which converts an electric signal into a picture by making use of light. A typical solid display device is an electro-optic device, in which electro-optic elements, which alter the angle of double refracted light in response to a voltage impressed thereon, are arranged in a predetermined pattern on a base plate to provide a display panel and wherein the display panel is combined with a polarizer to provide a display. The display device employing the electro-optic elements and one polarizer in combination is solid, and hence is small in size, easy to handle and stands long use. However, the electro-optic elements of the past have been defective in that brightness of display is not uniform unless their rays axes are arranged at predetermined angles as will be described in detail later on.

SUMMARY OF THE INVENTION

The present invention is directed to an electro-optic display device which consists of a display panel provided with at least one electro-optic element and means for causing the display panel to provide circular polarization of light.

Accordingly, one object of this invention is to provide an electro-optic display which provides uniform brightness in display to allow ease in interpretation of the message displayed irrespective of the arrangement of electro-optic elements.

Another object of this invention is to provide an electro-optic display device which is small in power dissipation, long-lived and capable of miniaturization.

Still another object of this invention is to provide an electro-optic display device which is capable of employing as a light source external light such as natural, artificial or like light relatively easily.

BRIEF DESCRIPTION OF THE DRAWINGS

FIG. 1 is an isometric view showing one example of electro-optic display devices, for explaining this invention;

FIG. 2 is an exploded isometric view of the display device exemplified in FIG. 1;

FIG. 3 is an isometric view illustrating a display panel of the display device shown in FIG. 1;

FIG. 4 is an isometric view showing an electro-optic element of the display device depicted in FIG. 3;

FIG. 5 is an iosmetric view illustrating another example of the electro-optic display device, for explaining this invention;

FIG. 6 is an exploded isometric view of the display device shown in FIG. 5;

FIG. 7 is an isometric view illustrating one example of an electro-optic display device produced according to this invention;

FIG. 8 is an exploded isometric view of the display device exemplified in FIG. 7;

FIG. 9 is a cross-sectional view showing a modified form of this invention; and

FIGS. 10 and 11 are isometric views illustrating other modifications of this invention.

DESCRIPTION OF THE PREFERRED EMBODIMENTS

To facilitate a better understanding of the present invention, a description will be given first in connection with one example of electro-optic display devices.

In FIG. 1 reference numeral 1 indicates generally a display device, 2 a display panel, 3 a first polarizing plate arranged forwardly of the display panel 2 and 4 a second polarizing plate arranged rearwardly of the display panel 2. In the present example, the display panel 2 and the first and second polarizing plates 3 and 4 are shown to be laminated in parallel with one another to provide a unitary structure. In FIG. 2 there is shown a diagrammatic exploded view of the display device 1.

As depicted in FIGS. 2 and 3, the display panel 2 consists of a base plate 8 made of a material which does not cause double refraction of light and electro-optic elements 9 arranged in a predetermined pattern in the base plate 8, which elements change the angle of double refraction of light in response to an impressed voltage due to the Pockels effect, Kerr effect, turnover of ferroelectric domains or the like. The electro-optic elements 9 are formed of, for example $Bi_{12}GeO_{20}$ or ZnSe. In the illustrated example, seven electro-optic elements 9a to 9g such, for example as having a length of about 4 to 6 millimeters and a square cross-section measuring, for example, 0.7 by 0.7 millimeters are arranged in a figure "8" configuration while being slightly spaced from adjacent ones. The electro-optic elements 9a to 9g are formed integral withe the base plate 8 (having a size of, for example, 30mm × 1.20mm × 1.50mm) as of a plastic material and having parallel planar surfaces 8A and 8B to provide the display panel 2.

The electro-optic element 9 is cut out from a block of, for example, $Bi_{12}GeO_{20}$ in such a manner that a pair of opposing planar peripheral surfaces 9A and 9B may be in the plane (110) and the other pair of opposing planar peripheral surfaces may be in the plane ($\overline{1}10$) and, for example, silver is vapor-deposited on the surfaces 9A and 9B to form electrodes 10A and 10B thereon, which establish an electric field in the [110] direction, as depicted in FIG. 4. The ray axes of such an electro-optic element 9 are in the [$\overline{1}10$] direction and in directions perpendicular thereto and at an angle of 45° to the [110] direction. Each of the electro-optic elements 9a to 9g is mounted on the base plate 8 with the peripheral surfaces 9D and 9E of the former being in parallel with the surfaces 8A and 8B of the latter so that light L passes through the element in a direction perpendicular to the peripheral surfaces 9D and 9E, that is, in the [110] direction. It is preferred to arrange the electro-optic elements 9a to 9g in such a manner that their ray axes may be in parallel with or cross one another at right angles so as to ensure uniform brightness in display. The electrodes, for example, 10A of the electro-optic elements 9a to 9g are connected to leads 12a to 12g respectively and the electrodes 12B are connected together to a common lead 12h and the leads 12a to 12g are lead out of the base plate 8. A DC voltage is impressed between the common lead 12h and selected one of the leads 12a to 12g.

The first and second polarizing plates 3 and 4 are disposed on the display panel 2 in such a manner that their polarizing planes both lie in the same direction (hereinafter referred to as an X-direction) as that of the electric field of the electro-optic elements 9 of the display panel 2 or cross it at right angles thereto (hereinafter referred to as a Y-direction).

The following will describe the operation of the display device 1 shown in FIGS. 1 and 2. In the case of displaying, for example, "3" with the display device, a predetermined DC voltage is impressed to the electro-optic elements 9a, 9c, 9d, 9f and 9g of the display panel 2 so that the phase difference between two extraordinary rays emanating from each element may be ½λ (λ being the wavelength of light).

Assume that the polarizing planes of the first and second polarizing plates 3 and 4 lie in Y and X directions respectively. When a light L emanating from a light source P such as a lamp or the like is directed to the back of the second polarizing plate 4, the light incident on the latter is linearly polarized in the X direction and passes through the display panel 2. In this case, the linear polarized light passes, as it is, through the base plate 2 and the electro-optic elements 9b and 9e which are not supplied with the voltage and does not pass through the first polarizing plate 3, but the light incident on the electro-optic elements 9a, 9c, 9d, 9f and 9g supplied with the voltage is polarized through 90° that is, in the Y direction and then passes through the first polarizing plate 3.

Thus, the electro-optic elements 9a, 9c, 9d, 9f and 9g appear bright to provide a display of 3 on a dark background Where the base plate 8 of the display panel 2 is formed of a light transparent material and the polarizing planes of the first and second polarizing plates 3 and 4 are arranged in parallel with each other in the display device 1 of FIG. 1, the electro-optic elements 9a, 9c, 9d, 9f and 9g appear dark to display 3 on a white background.

The foregoing display device is designed so that a linear polarized light is incident on the display panel 2. Accordingly, in the event that all the ray axes of the electro-optic elements are not arranged to be at an angle of 45° with respect to the linear polarized light incident on the display panel 2, brightness of the display is not uniform. Namely, when the electro-optic elements are curved or their ray axes are neither parallel nor perpendicular to each other, brightness of the display is impaired.

Another display device 1' is shown in FIGS. 5 and 6. The display device 1' consists of a display panel 2' having arranged therein a plurality of electro-optic elements 9a' to 9g' in a predetermined pattern and a polarizing plate 3' and a scattering reflecting plate 5' disposed on the front and back of the display panel 2' respectively. The scattering reflecting plate 5' may be a reflecting mirror, (produced by vapor deposition of silver on a glass plate having a rough surface of, for example No. 200) which scatters light incident thereon or a combination of a total reflecting mirror with a frosted glass or lenticular lens. In the case of displaying, for example, 3 with the display device 1', a predetermined DC voltage is impressed to the electro-optic elements 9a', 9c', 9f and 9g' of the display panel 2' so that the phase difference between two extraordinary rays emanating therefrom may be ¼λ (λ being the wavelength of light). Then, the front of the polarizing plate 3' (having a polarizing plane in the X direction), is irradiated by light from a light source P such as a lamp or the like, in which case the light incident on the polarizing plate 3' is linearly polarized in the X direction and this linear polarized light passes through the display panel 2'. In this case, the rays of the linear polarized light pass, as they are, through the base plate 8' and the electro-optic elements 9b' and 9e' which are not supplied with the voltage but the rays incident on the electro-optic elements 9a', 9c', 9d', 9f and 9g' are displaced ¼λ apart in phase, so that the light is circularly polarized. Then, the linear polarized light and the circular polarized one emanating from the display panel 2' are reflected by the scattering reflecting plate 5' back to the display panel 2' while being held polarized. In this case, the linear polarized light reflected by the scattering reflecting plate 5' passes, as it is, through the base plate 8' and the electro-optic elements 9b' and 9e' which are not supplied with the voltage and then the linear polarized light passes through the polarizing plate 3' because it has been polarized in the X direction. While, when the circular polarized light enters the electro-optic elements 9a', 9c', 9d', 9f and 9g' supplied with the voltage, its rays are further displaced ¼λ, with the result that the circular polarized light is linearly polarized in the Y direction and does not pass through the polarizing plate 3'.

Thus, the electro-optic elements 9a', 9c', 9d', 9f and 9g' inhibiting the passage therethrough of the light appear dark to display 3 on a white background.

In the case of the scattering reflecting palte 5' being of a relatively high degree, even if the incident light thereon is a polarized one, the reflected light becomes almost natural light and the display above described is not achieved. Accordingly, it is necessary to use the scattering reflecting plate 5' whose scattering degree is relatively low so as to ensure that the reflected light may remain polarized as predetermined.

With the display device of FIG. 5, the reflected light from the scattering reflecting plate 5' inevitably becomes a little out of polarization and close to a natural light to some extent, and accordingly it is difficult to obtain satisfactory contrast between the electro-optic elements supplied with the voltage and the base plate and the electro-optic elements which are not supplied with the voltage.

The present invention is to eliminate such defects experienced in the prior display devices.

With reference to the drawings one example of this invention will be described in detail. In the drawings elements similar to those in FIGS. 1 to 4 are marked with the same reference numerals.

FIG. 7 illustrates one example of a display device of this invention and FIG. 8 its exploded view. In the illustrated example a second double refracting plate 7 is interposed, as a polarization converting means, between the second polarizing plate 4 and the display panel 2 of the display device 1 of FIG. 1. The double refracting plate 7 is disposed so that its ray axis may be at 45° with respect to the polarizing plane of the second polarizing plate 4. Further, the double refracting plate 7 may be, for example, a polyethylene terephthalate plate and its thickness is so selected that ordinary and extraordinary rays therefrom may be displaced ¼λ apart in phase. In this case, the pair of the second polarizing plate 4 and the double refracting plate 7 constitutes means for circular polarization of light, that is, a circular polarizing plate.

Interposed between the display panel 2 and the first polarizing plate 3 is a first double refracting plate 6 serving as polarization converting means, that is, means for converting a circular polarizaed light into a linear polarized one and vice versa. The double refracting plate 6 is disposed with its ray axis being at 45° to the polarizing plane of the first polarizing plate 3 and perpendicular to the ray axis of the second double refracting plate 7. Further, the double refracting plate 6 is, for example, a polyethylene terephthalate plate, whose thickness is selected such that ordinary and extraordinary rays therefrom may be displaced ¼λ apart in phase.

The electro-optic elements 9a to 9g of the display panel 2 may be arranged in the manner previously described in connection with FIGS. 2 and 3 but, in the present example, the electro-optic elements 9a to 9g are arranged in the letter 8 configuration of italic type.

The display panel 2, the first and second polarizing plates 3 and 4 and the first and second double refracting plates 6 and 7 are assembled together as a unitary structure to provide the display device 1.

In the illustrated example, the first and second polarizing plates 3 and 4 with their polarizing planes being in the X- and Y-directions respectively, as is the case with the display device 1 of FIG. 1.

The following will describe the operation of such a display device 1. In the case of displaying 3 as in the case of FIG. 1, a predetermined voltage is applied to the electro-optic elements 9a, 9c, 9d, 9f and 9g in such a manner that two extraordinary rays of light incident thereon may be phased ½λ apart from each other.

The rays of light L from the light source P are linearly polarized in the X-direction by the second polarizing plate 4 and then displaced ¼λ apart in phase by the second double refracting plate 7 to provide a circular polarized light. Then, the circular polarized light is incident on the display panel 2. In this case, it passes, as it is, through the electro-optic elements 9b and 9e which are not supplied with the voltage, but the circular polarized light incident on the electro-optic elements 9a, 9c, 9d, 9f and 9g supplied with the voltage is caused to be opposite in the rotational direction of circular polarization. The rays of the circular polarized light emanating from the electro-optic elements 9a, 9c, 9d, 9f and 9g are phased ¼λ apart by the first double refracting plate 6 to provide a linear polarized light of the Y-direction, which passes through the first polarizing plate 3. While, the rays of the circular polarized light emanating from the electro-optic elements 9b and 9e are displaced ¼λ apart in phase by the first double refracting plate 6 to provide a linear polarized light of the X-direction, which does not pass through the first polarizing plate 3.

Thus, the electro-optic elements 9a, 9c, 9d, 9f and 9g appear bright to display 3 on a dark background.

In the display device 1 of FIG. 7, where the base plate 8 of the display panel is formed of a light transparent material and the first and second double refracting plates 6 and 7 are disposed with their ray axes being in parallel with each other, the electro-optic elements 9a, 9c, 9d, 9f and 9g appear dark to display 3 on a bright background.

The light source of the display device 1 may be a lamp or like artificial light source which is incorporated in the device and the light source is not limited specifically thereto but may be a natural light source, that is, the sun's rays or artificial illumination. FIG. 9 shows a modified form of this invention which is capable of utilizing external light as a light source. Reference numeral 1a indicates generally a display unit corresponding to that 1 of FIG. 7 and 100 display device consisting of the display unit 1a and a light introducing unit 15 disposed substantially perpendicular to the former. The light introducing unit 15 is made up of a columnar light transparent member 16, a light reflecting wall 17 wrapped around the periphery of the transparent member 16, the upper end portion of the member 16 serving as a lighting portion 17a, and a scattering refracting plate 18 disposed at the lower end of the member 16. The surface 17c of the reflecting wall 17 is a mirror surface vapor-deposited with, for example, silver.

The scattering reflecting plate 18 is disposed at an angle of, for example, 45° to the display unit 1a in such a manner that light having passed through the light introducing portion 15 may be reflected by the plate 18 toward the second polarizing plate 4 of the display unit 1a. Reference numeral 20 designates a hood of the display unit 1a. The light introducing portion 15 of the display device 100 may also be a fiber scope or the like.

According to the display device of this invention, the ray axes of the electro-optic elements of the display panel 2 need not be in parallel or perpendicular to each other, so that even if the electro-optic elements are curved or arranged with their ray axes being neither in parallel nor perpendicular to each other, for example, arranged in italic type, brightness of display is held uniform. Further, since the pair of the first polarizing plate 3 and the double refracting plate 6 and the pair of the second polarizing plate 4 and the second double refracting plate 7 are both considered to provide circular polarized light, that is, serve as circular polarizing plates, the electro-optic elements may be arranged at will as above described and, in addition, the relationship between the crystallographical orientation of the two circular polarizing plates and that of the electro-optic elements can be selected as desired.

In each of the display devices of FIGS. 7 and 9 light is directed to the back of the device and the display is viewed from the front. However, it is also possible to provide a reflecting plate at the back of the display device, in which case light is shone on the front of the device and display is viewed from the front. FIGS. 10 and 11 show such display devices. In FIG. 10 a scattering reflecting plate 5 is added to the display device 1 of FIG. 8. Namely, a second double refracting plate 7 is interposed as a polarized light converting means between the second polarizing plate 4 and the display panel 2 and the double refracting plate 7 is disposed with its ray axis being at an angle of 45° to the polarizing plane of the second polarizing plate 4. Further, the double refracting plate 7 is, for example, a polethylene terephthalate plate and its thickness is selected so that ordinary and extraordinary rays therefrom may be displaced ¼λ apart in phase. In this case, the second polarizing plate 4 and the double refracting plate 7 serve to provide a circular polarized light.

Further, between the display panel 2 and the first polarizing plate 3 a first double refracting plate 6 is disposed as a polarized light converting means, namely means for converting a circular polarized light into a linear polarized one. The double refracting plate 6 is disposed with its ray axis being 45° to the polarizing plane of the first polarizing plate 3 and perpendicular to, for example, the ray axis of the second double refracting plate 7. The double refracting plate 6 is, for example, a polyethylene terephthalate plate and its thickness is selected so that ordinary and extraordinary rays may be displaced ¼λ apart in phase.

Since the display panel 2 is identical in construction with that depicted in FIG. 8, its construction is not shown in detail in FIG. 10. However, the following description will be given based on the fact that the display panel 2 includes the electro-optic elements 9a to 9g.

The display panel 2, the first and second polarizing plates 3 and 4, the first and second double refracting plates 6 and 7 and the scattering reflecting plate 5 are assembled together to provide the display device 1.

In the illustrated example the first and second polarizing plates 3 and 4 are disposed with their polarizing planes in the X-direction and the base plate 8 of the display panel 2 is a light transparent plate.

The following will describe the operation of the display device 1 shown in fig. 10. In the case of displaying, for example, 3 with the display device, a predetermined DC voltage is impressed to the electro-optic elements 9a, 9c, 9d, 9f and 9g of the display panel 2 to phase two extraordinary rays ¼λ apart. When light is directed to the front of the first polarizing plate 3, it is linearly polarized in the X-direction and its rays are displaced ¼λ apart in phase by the first double refracting plate 6 to provide a circular polarized light. In this case, the circular polarized light passes, as it is, through the base plate 8 and the electro-optic elements 9b and 9e which are not supplied with the voltage and the circular polarized light is linearly polarized by the second double refracting plate 7 in the X-direction and enters the scattering reflecting plate 5 through the second polarizing plate 4. On the other hand, when the circular polarized light from the first double refracting plate 6 passes through the electro-optic elements 9a, 9c, 9d, 9f and 9g supplied with the voltage, rays of the circular polarized light are phased ½λ apart to provide a circular polarized light rotating in a direction opposite that of the circular polarized light incident on the electro-optic elements. The circular polarized light is linearly polarized in the Y-direction and cannot pass through the second polarizing plate 4. Then, one portion of the reflected light of the linear polarized light incident on the scattering reflecting plate 5 becomes a natural light but the reflected light is linearly polarized by the second polarizing plate 4 in the X-direction and this linear polarized light is rendered by the second double refracting plate 7 into a circular polarized light. The circular polarized light thus obtained passes, as it is, through the electro-optic elements 9b and 9e and the base plate 8 and is linearly polarized by the first double refracting plate 6 in the X-direction and then passes through the first polarizing plate 3.

Thus, the electro-optic elements 9a, 9c, 9d, 9f and 9g appear dark to display 3 on a bright background.

Where the first and second double refracting plates 6 and 7 are disposed with their ray axes being in parallel with each other, a bright display is provided on a dark background.

In FIG. 11 a double refracting plate 6' for converting a circular polarized light into a linear polarized one and vice versa is interposed between the polarizing plate 3' and the display panel 2' of the display device 1' of FIG. 5. The double refracting plate 6' is disposed with its ray axis being at 45 degrees to the polarizing plane of the polarizing plate 3'. Further, the double refracting plate 6' is similarly a polyethylene terephthalate plate and its thickness is selected so that ordinary and extraordinary rays therefrom may be displaced ¼λ apart in phase. Since the display panel 2' is identical in construction with that of the display device 1' of FIG. 5, its detailed construction is not shown.

The operation of the display device 1' of FIG. 11 will hereinbelow be described. In the case of displaying, for example, 3 with the display device 1', a predetermined DC voltage is applied to the electro-optic elements 9a', 9c', 9d', 9f' and 9g' by which two extraordinary rays are phased ¼λ apart. Assume that the polarizing plate 3' has a polarizing plane, for example, in the X-direction. When light is shone on the polarizing plate 3' it is linearly polarized in the X-direction and its rays are displaced ¼λ apart in phase by the double refracting plate 6' to provide a circular polarized light. This circular polarized light passes, as it is, through the base plate 8 and the electro-optic elements 9b' and 9e', which are not supplied with the voltage, and reflected by the scattering reflecting plate 5'. The reflected light passes again, as it is, through the electro-optic elements 9b' and 9e' and the base plate 8' but its rays are displaced ¼λ apart in phase by the double refracting plate 6', so that the light is converted into a linear polarized light in the Y direction and incident on the polarizing plate 3' but does not pass therethrough. However, rays of the circular polarized light produced by the polarizing plate 3' and the double refracting plate 6' are phased ¼λ apart in phase by the electro-optic elements 9a', 9c', 9d', 9f' and 9g' supplied with the voltage to provide a linear polarized light of Y-direction. This polarized light is reflected by the scattering plate 5' and its rays are again displaced ¼λ apart in phase by the electro-optic elements supplied with the voltage to produce a circular polarized light, which is then incident on the double refracting plate 6'. The rays of the circular polarized light is phased ¼λ apart, so that the light is linearly polarized in the X-direction and the linear polarized light passes through the polarizing plate 3'.

Thus, the electro-optic elements 9a', 9c', 9d', 9f' and 9g' appear bright to display 3 on a dark background.

Each of the display devices of FIGS. 10 and 11 are designed so that a circular polarized light is incident on the display panel 2. Accordingly, the ray axes of the electro-optic elements of the display panel need not be in parallel or perpendicular to each other, so that even if the electro-optic elements are curved or arranged with their ray axes being neither in parallel nor perpendicular to each other, for example, in italic type brightness of display is held uniform. Further, the pair of the first polarizing plate 3 and the first double refracting plate 6 and the pair of the second polarizing plate 4 and the second double refracting plate 7 are both considered as circular polarizing plates, so that the electro-optic elements may be arranged as desired and, in addition, the relationship between the crystallographical orientation of the two circular polarizing plates and that of the electro-optic elements can be selected at will.

With the present invention described above, electro-optic elements, which changes the angle of double refraction with a voltage impressed thereto, are attached to a base plate in a predetermined pattern to provide a display panel, which is assembled with polarizing plates to form a display device. Therefore, it is possible to obtain a display device which is small in power consumption, long in service life and capable of miniaturization.

Further, in the present invention a polarizing plate is placed forwardly of the display panel, a scattering reflecting plate is disposed rearwardly of the display panel and light is shone on the front of the polarizing plate, so that external light such as natural, artificial or like light can be utilized as a light source of the display device relatively easily and the display device can be used without incorporating the light source therein. This leads to miniaturization of the display device and reduction in power consumption.

In addition, since the reflected light from the scattering reflecting plate is supplied to the display panel after being sufficiently polarized by the polarizing plate, there is provision for enhancing the contrast in the display.

Although the foregoing description has been given in connection with the case where the electro-optic elements are formed of $Bi_{12}GeO_{20}$ the elements need not be limited specifically thereto and may be formed of, for example, $Bi_{12}SiO_{20}$ ZnSe or the like. That is, the elements may be formed of any material, so long as it varies the angle of double refraction with a voltage impressed thereto due to the Pockels effect, Kerr effect, turnover of ferroelectric domains or the like.

Further, the pattern of the electro-optic elements of the display panel is not limited specifically to the aforementioned but may be selected at will. In practice, it is possible to display a number containing a plurality of figures with a plurality of such display devices arranged in side-by-side relation.

It will be apparent that many modifications and variations may be effected without departing from the scope of the novel concepts of this invention.

We claim as our invention:

1. An electro-optic display device providing uniform brightness of display comprising a five plate sandwich, the center plate being formed of an isotropic light transmitting material and having a plurality of solid electro-optic elements of different sizes disposed therein at any desired angular orientation, the outer plates being polarizing plates, the intermediate plates between said outer plates and said center plates being double refracting plates with their ray axes disposed at 45° to the polarizing plane of their respective associated outer plates, said electro-optic elements being formed of a material which changes the angle of double refraction of light in response to an impressed voltage thereon and means to selectively impress a voltage on at least one of said electro-optic elements and the material forming said electro-optic elements being such that the planes of polarization of light passing therethrough will be shifted 90° when a voltage is applied thereto.

2. An electro-optic display device according to claim 1 including a scattering reflecting plate attached to one of said outer plates of said plate sandwich.

3. An electro-optic display device according to claim 1 in which one of said outer plates has one portion which extends beyond the edge of said sandwich, a light scattering reflecting plate mounted at a 45° angle to the plane of said center plate and which abutts an edge of said one outer plate which is opposite said one portion of said one plate.

4. An electro-optic display device according to claim 3 including a light introducing means connected to said light scattering and reflecting plate to provide light to said electro-optic elements.

5. An electro-optic display device according to claim 1 wherein said plurality of electro-optic elements comprise at least seven elements arranged in a pattern such that the integers from zero to nine can be selectively displayed and wherein the elements may have any desired angular relationship to each other.

6. An electro-optic display device according to claim 1 in which one of said outer plates is linearly polarized in the X-plane and the other outer plate is polarized in the Y-plane.

7. An electro-optic display device according to claim 1 in which both of said outer plates are linearly polarized in the same plane.

8. An electro-optic display device according to claim 1 in which said electro-optic elements are blocks of $Bi_{12}GeO_{20}$ with one pair of peripheral surfaces in the plane (110) and with a second pair of peripheral surfaces in the plane ($\bar{1}10$) the ray axes of said elements being in the direction and in directions perpendicular thereto and at an angle of 45° to the (110) direction.

* * * * *